(12) United States Patent
Wu

(10) Patent No.: US 10,557,768 B2
(45) Date of Patent: Feb. 11, 2020

(54) PRESSURE GAUGE INCLUDING SCALE WITH GRADUATIONS SPACED DIFFERENTLY

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 308 days.

(21) Appl. No.: 15/725,305

(22) Filed: Oct. 5, 2017

(65) Prior Publication Data

US 2018/0356307 A1 Dec. 13, 2018

(30) Foreign Application Priority Data

Jun. 8, 2017 (TW) .............................. 106119033 A

(51) Int. Cl.
*G01L 7/16* (2006.01)
(52) U.S. Cl.
CPC .................................. *G01L 7/166* (2013.01)
(58) Field of Classification Search
CPC ...................................................... G01L 7/166
USPC ............................................................ 73/146
See application file for complete search history.

(56) References Cited

U.S. PATENT DOCUMENTS

| | | | |
|---|---|---|---|
| 2,483,237 A * | 9/1949 | Rose | G01L 7/04 73/711 |
| 2,737,811 A * | 3/1956 | Modes | G01L 7/04 73/711 |
| 2015/0078920 A1* | 3/2015 | Chou | F04B 41/02 417/63 |

* cited by examiner

*Primary Examiner* — Walter L Lindsay, Jr.
*Assistant Examiner* — Philipmarcus T Fadul
(74) *Attorney, Agent, or Firm* — Alan D. Kamrath; Mayer & Williams PC

(57) ABSTRACT

A pressure gauge includes a base, a dial, an indicator, and an actuating device. The base defines a channel. The dial has graduations in a first region for low pressures, graduations in a second region for high pressures, and a middle graduation located between the first and second regions. The graduations in the first region are spaced at a first distance. The graduations in the second region are spaced at a second distance different from the first distance. The actuating device includes a pressure responding device and a plunger held in the channel. The plunger is abutted by the pressure responding device. The pressure responding device includes a first and second resilient member having a different modulus of elasticity and arranged in series. The shaft is rotated in response to movement of the plunger.

18 Claims, 12 Drawing Sheets

PRESSURE GAUGE INCLUDING SCALE WITH GRADUATIONS SPACED DIFFERENTLY

BACKGROUND OF THE INVENTION

1. Field of the Invention

The present invention relates to a pressure gauge and, particularly, to a pressure gauge including a scale with graduations spaced differently.

2. Description of the Related Art

It is known that there are many kinds of bicycle tires and that normal tire pressures vary between different types of tires. For a high pressure tire, it can have a normal tire pressure about 120 psi. For a low pressure tire, it can have a normal tire pressure about 30 psi. Therefore, a conventional pressure gauge 90 with graduations from 0 to 180 psi is suitable for measuring a pressure in a high pressure tire or a pressure in a low pressure tire, as shown in FIG. 12. Although the pressure gauge 90 can measure pressures in the range of 0 psi to 180 psi, it is not easy to read an indicated low pressure. Furthermore, the pressure gauge 90 is unable to provide a precise low pressure measurement.

The present invention is, therefore, intended to obviate or at least alleviate the problems encountered in the prior art.

SUMMARY OF THE INVENTION

According to the present invention, a pressure gauge includes a base, a dial, an indicator, and a shaft. The base defines a channel. The dial is located on the base. The dial has graduations ranging from a first graduation to a last graduation and includes a middle graduation located between the first and last graduations. The graduations of the dial are divided by the middle graduation into a first region for low pressure measurements and a second region for high pressure measurements. The first region includes the graduations between the first and middle graduations. The graduations in the first region are equally spaced at a first distance. The second region includes the graduations between the middle and last graduations. The graduations in the second region are equally spaced at a second distance different from the first distance. The indicator is adapted to point graduations on the dial. The shaft is rotatably connected to the base. The indicator is connected to the shaft and rotates simultaneously with rotation of the shaft. Further, an actuating device includes a pressure responding device and a plunger. The pressure responding device and the plunger are held in the channel. The plunger is abutted by the pressure responding device. The pressure responding device includes a first and second resilient member having a different resilient member and arranged in series. The first and second resilient members change their lengths and the plunger is urged by the first and first and second resilient members when the indicator registers with different graduations. The plunger is connected to the shaft. The shaft is rotated in response to movement of the plunger.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
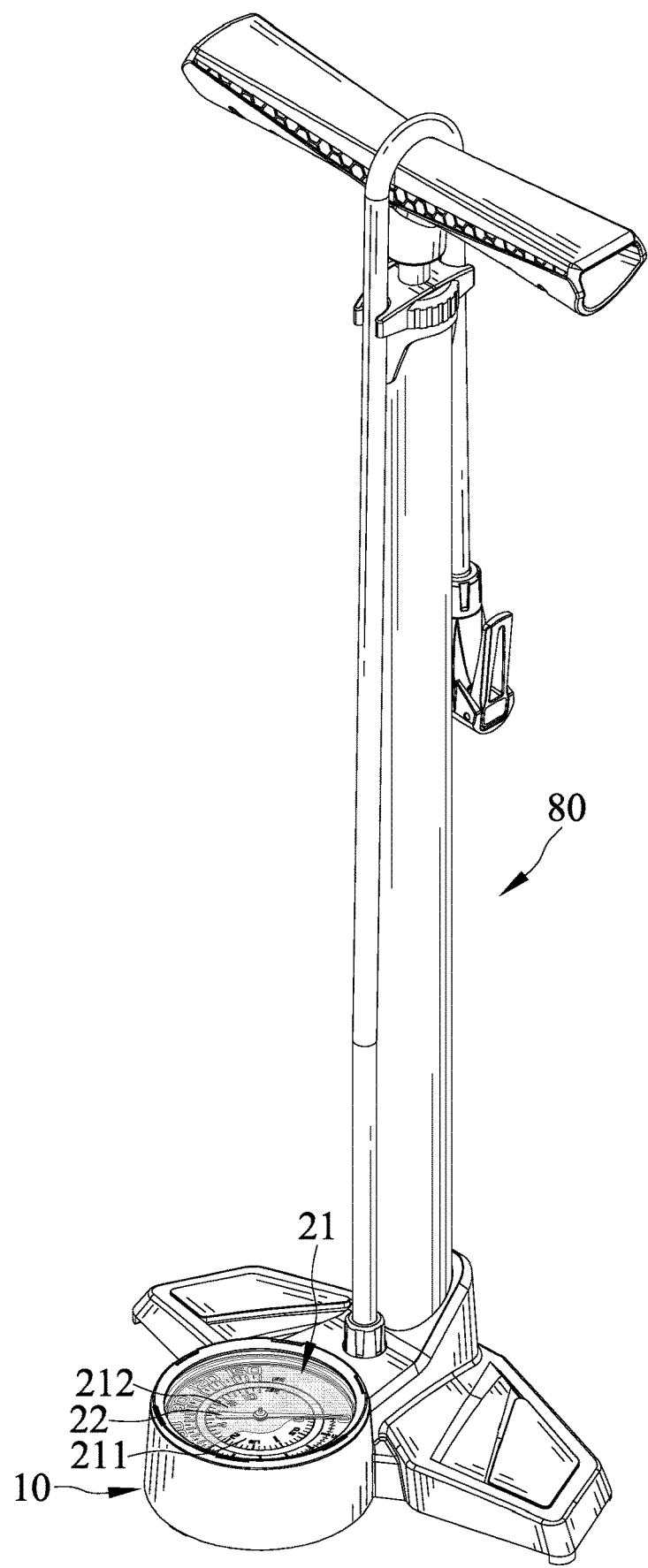
FIG. 1 is a perspective view showing a pump with a pressure gauge in accordance with the present invention, with the pressure gauge including a scale with graduations spaced differently.
Figure 2:
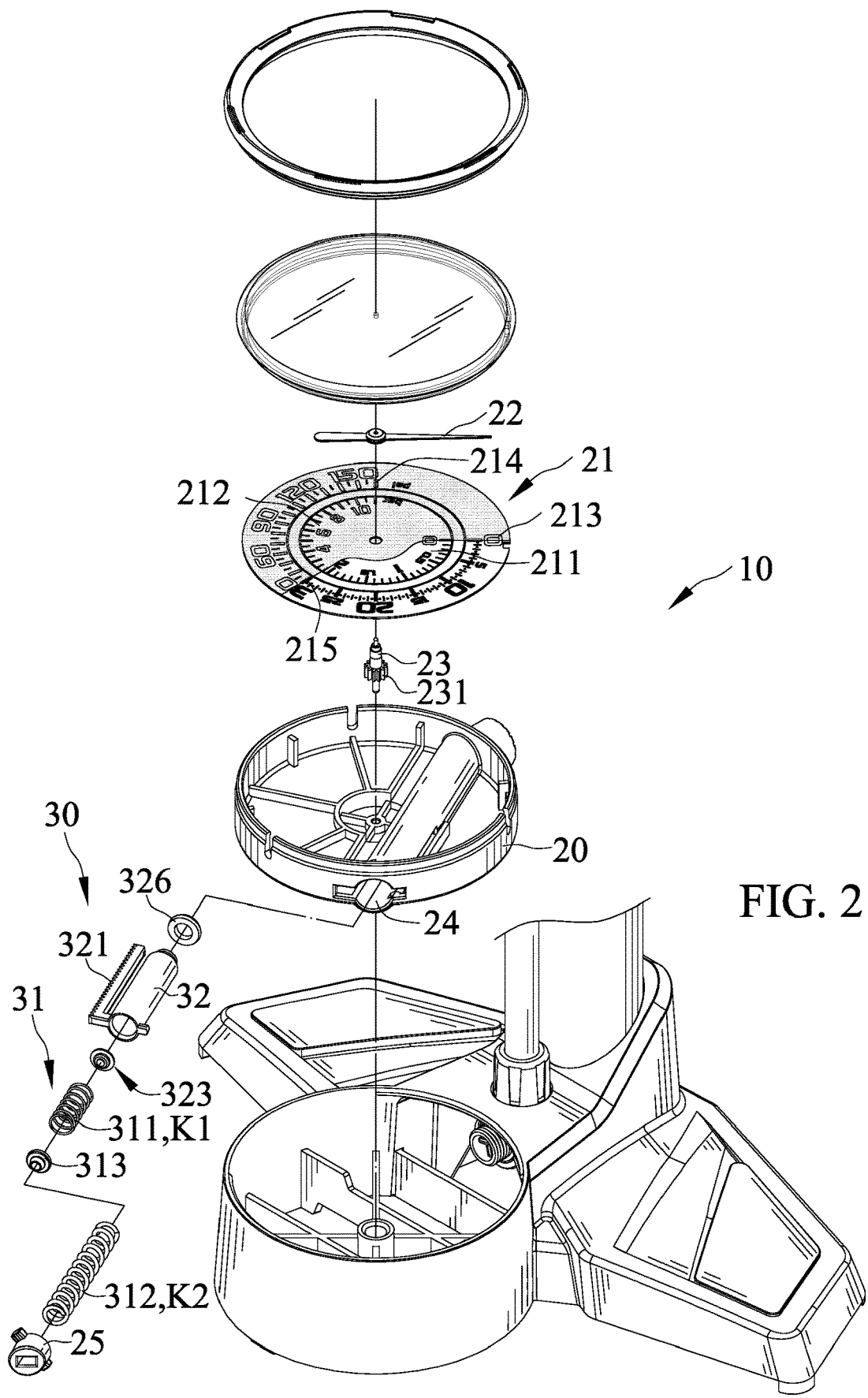
FIG. 2 is an exploded perspective view of the pressure gauge of the present invention.
Figure 3:
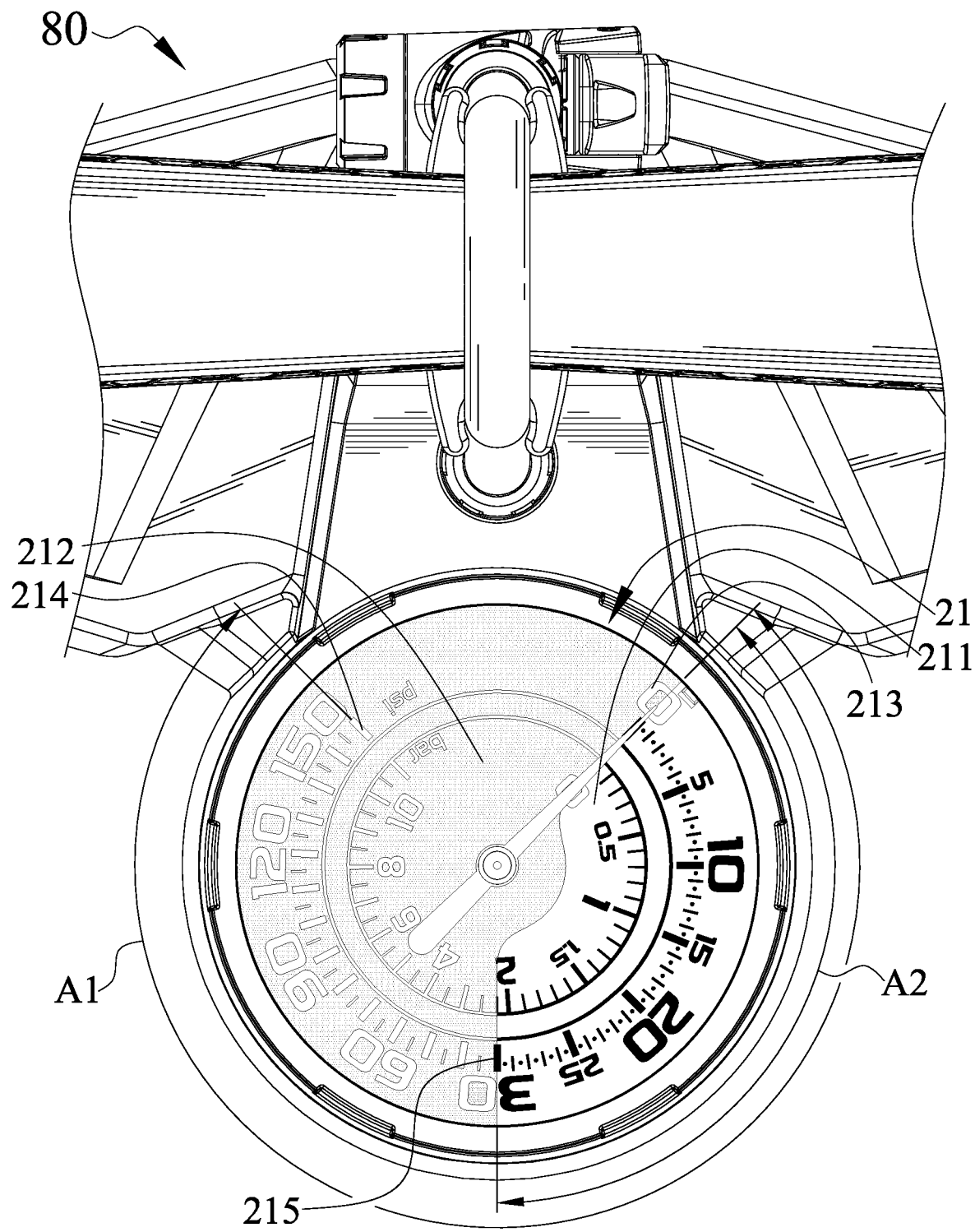
FIG. 3 is a top view of the pressure gauge of the present invention.
Figure 4:
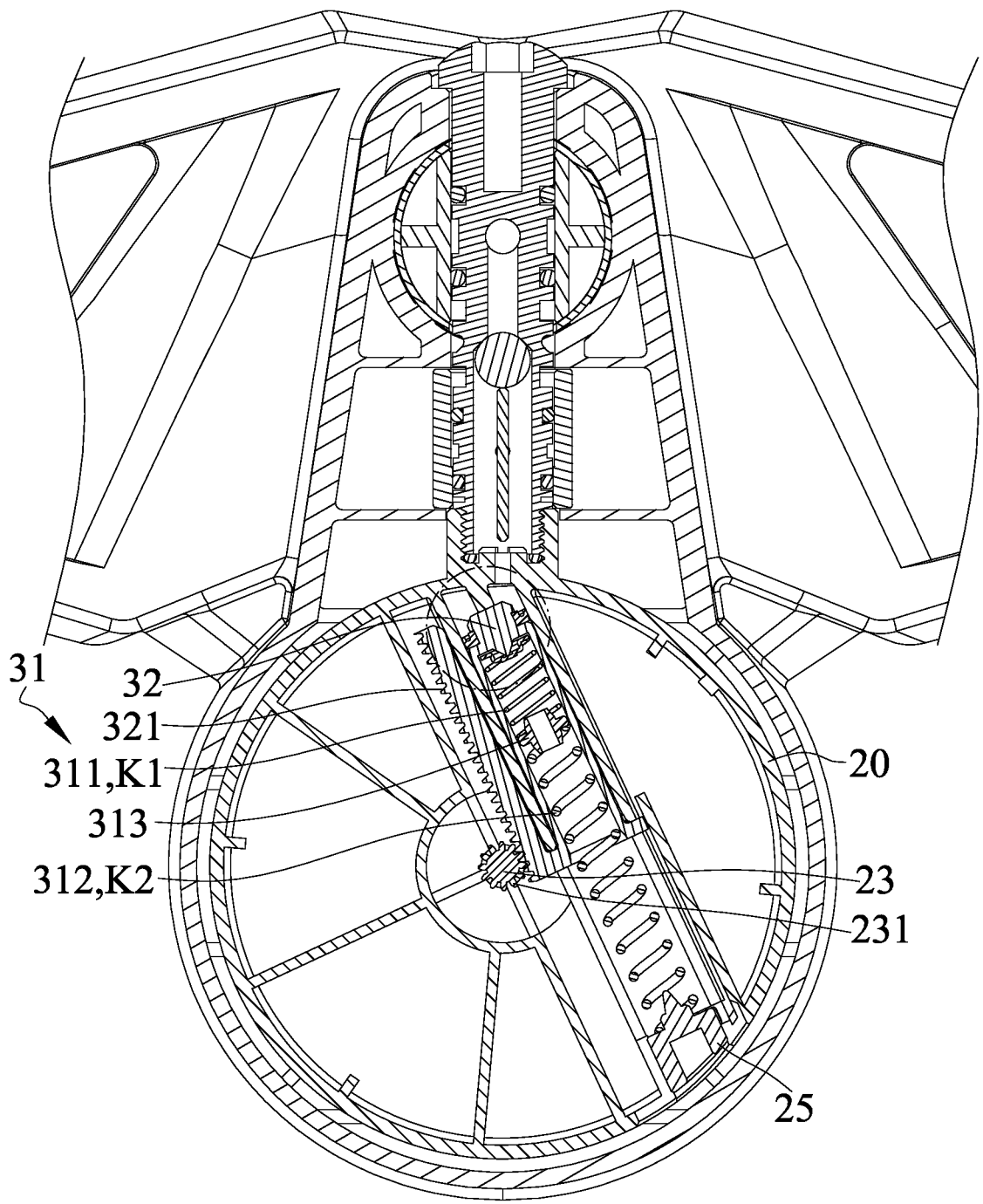
FIG. 4 is a cross-sectional view of the pressure gauge of the present invention.
Figure 5:
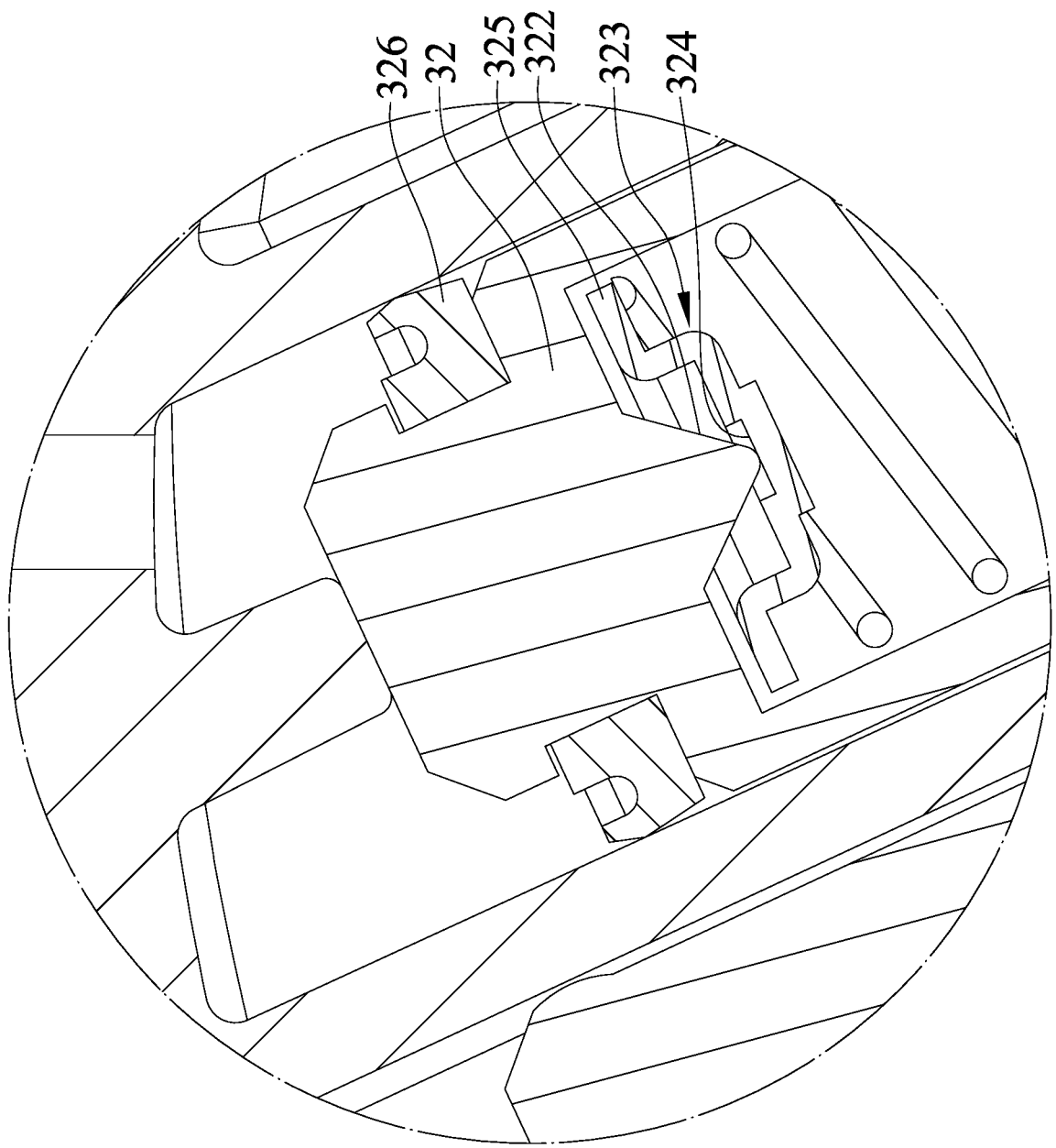
FIG. 5 is an enlarged cross-sectional view of FIG. 4.
Figure 6:
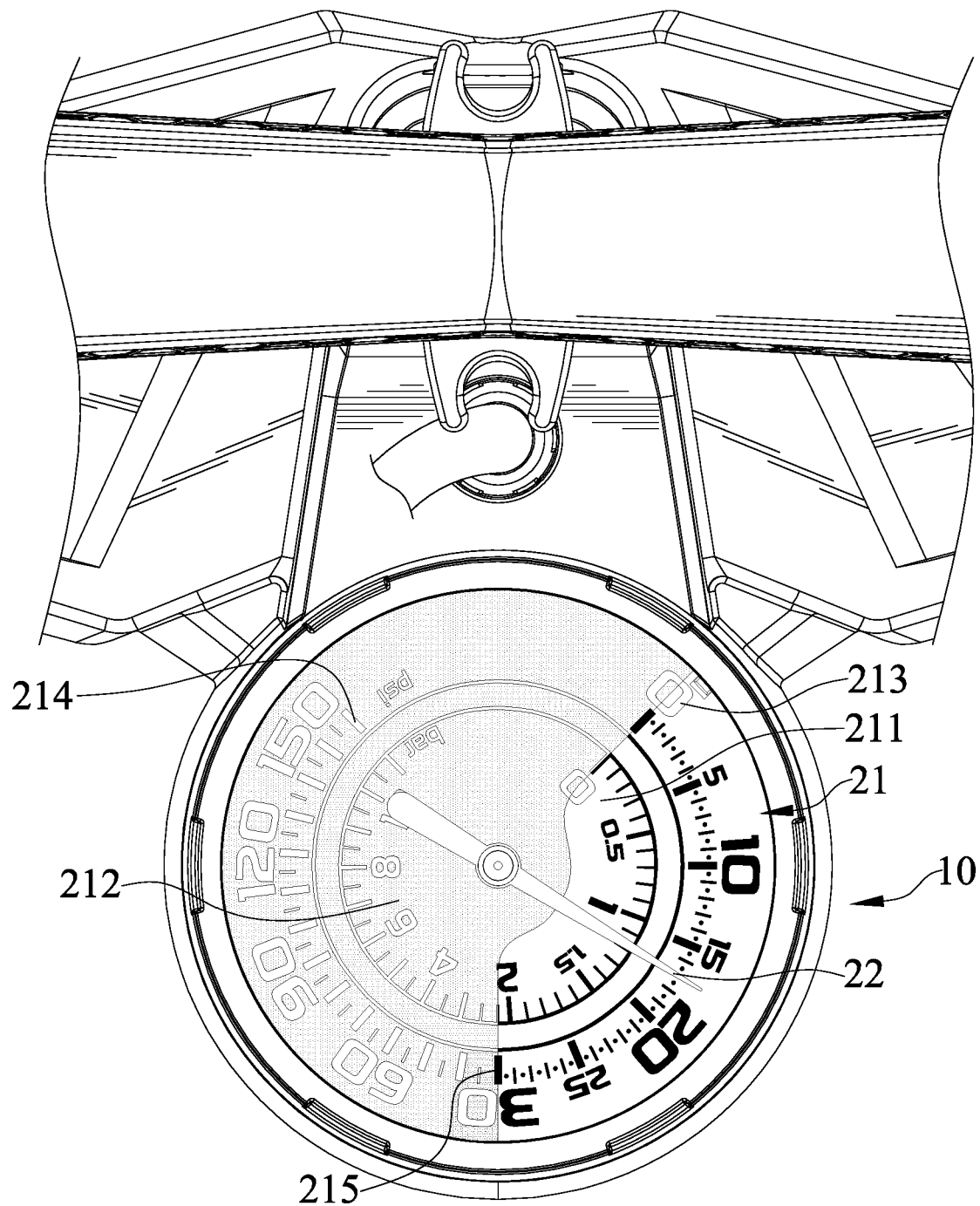
FIG. 6 is a top view showing an indicator of the pressure gauge of the present invention in a first region which includes graduations for low pressure measurements.
Figure 7:
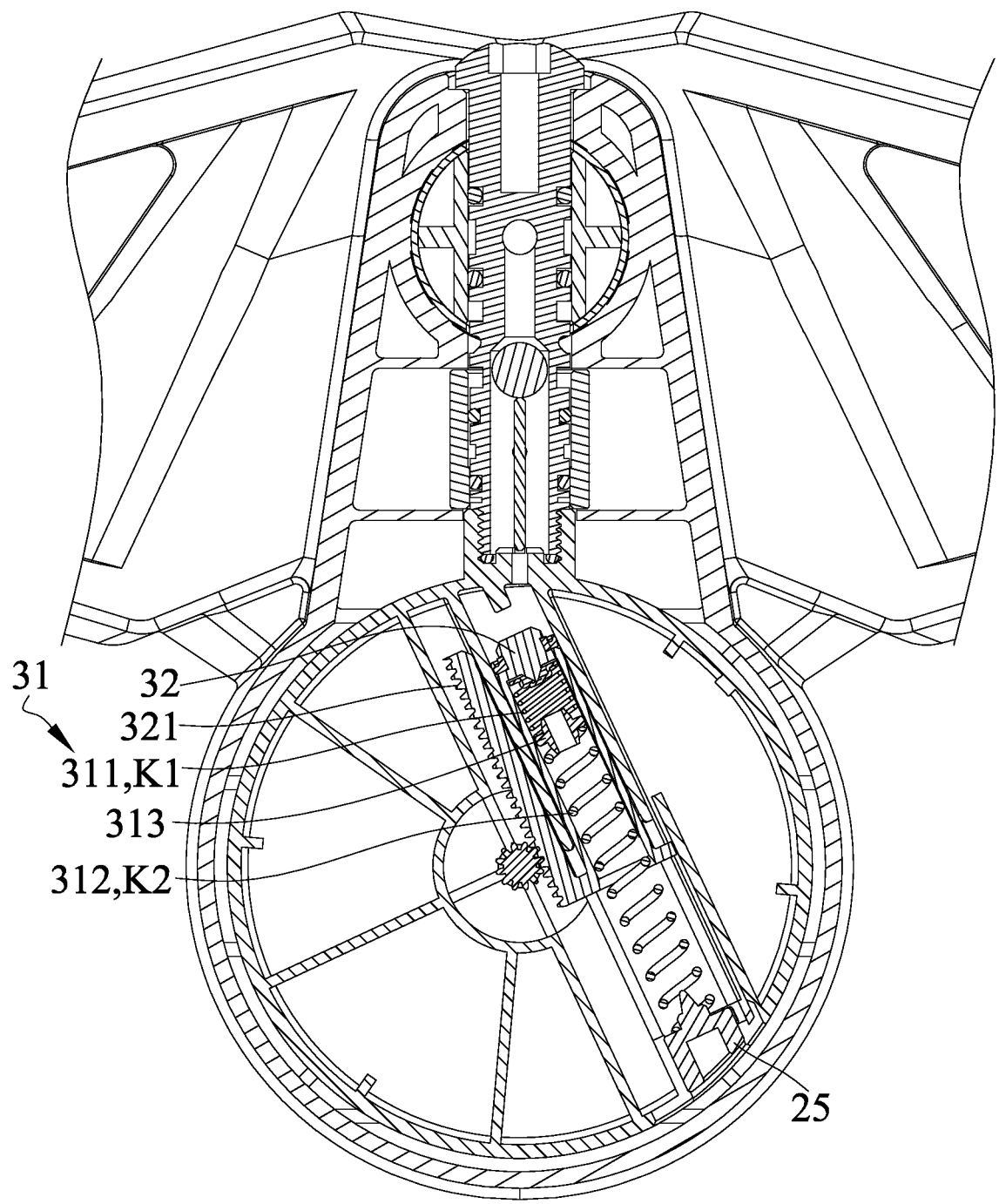
FIG. 7 is a cross-sectional view different from FIG. 4 in that the indicator is in the position shown in FIG. 6.
Figure 8:
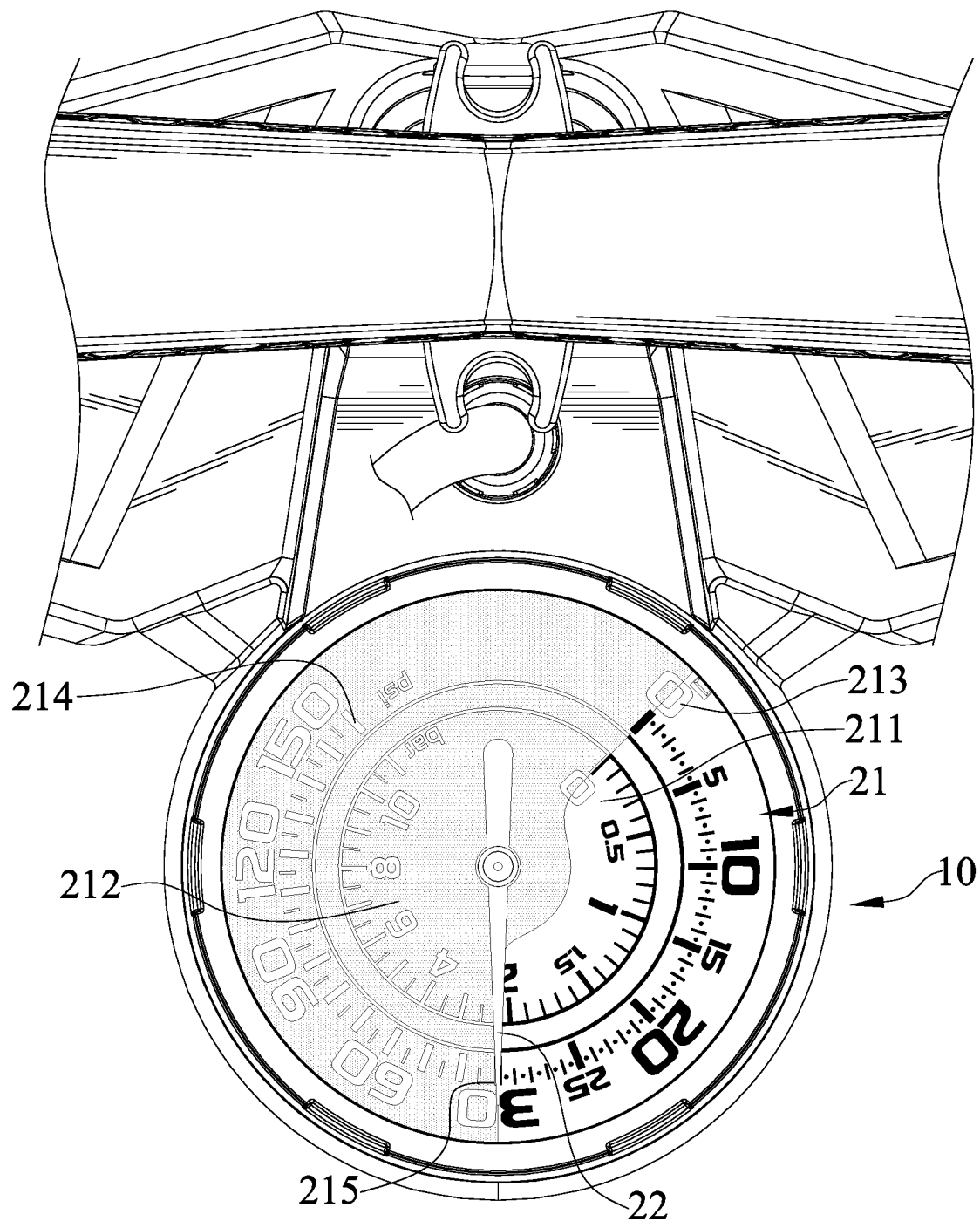
FIG. 8 is a top view showing the indicator of the pressure gauge of the present invention in a position between the first region and a second region which includes graduations for high pressure measurements.
Figure 9:
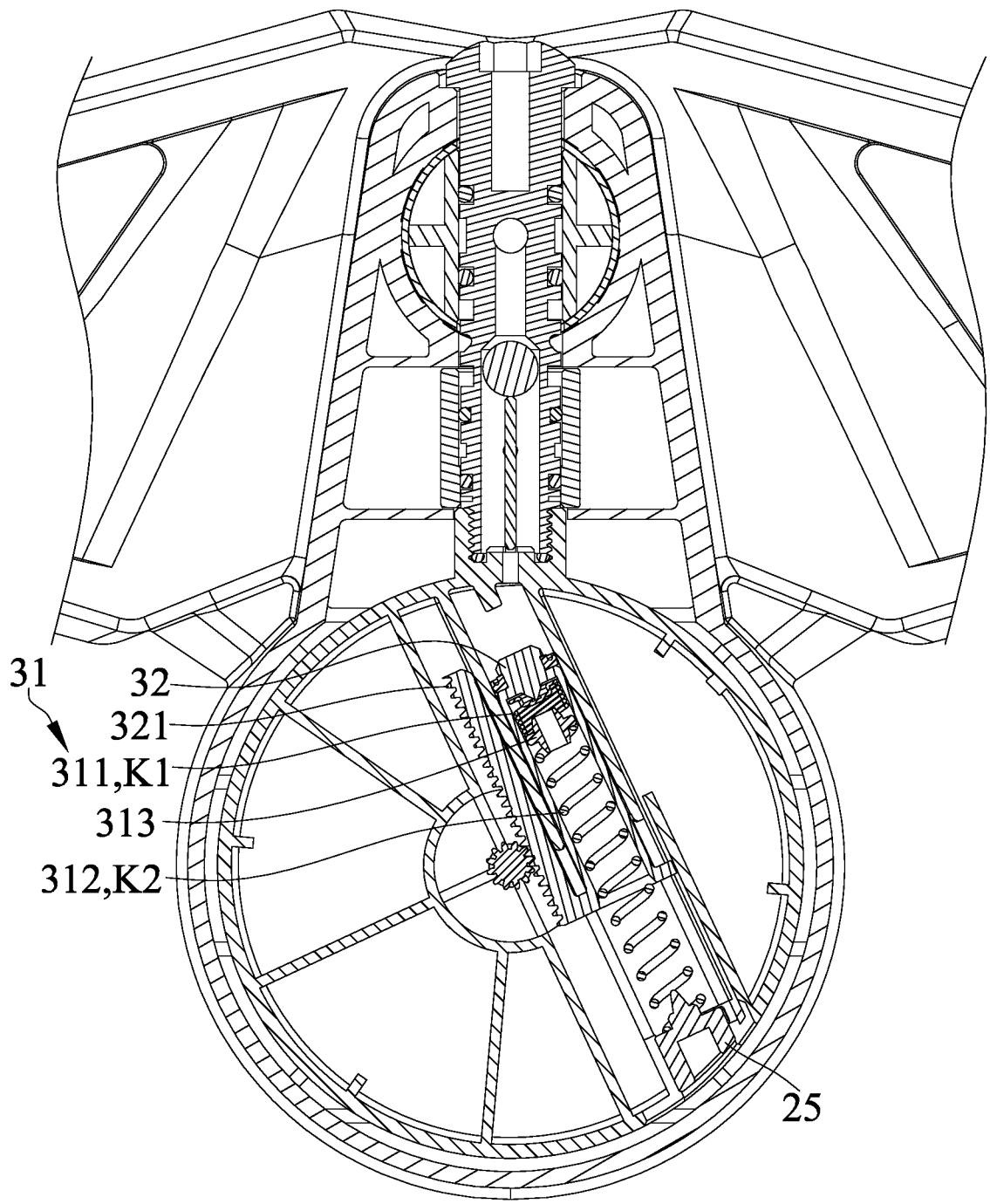
FIG. 9 is a cross-sectional view different from FIG. 4 in that the indicator is in the position shown in FIG. 8.
Figure 10:
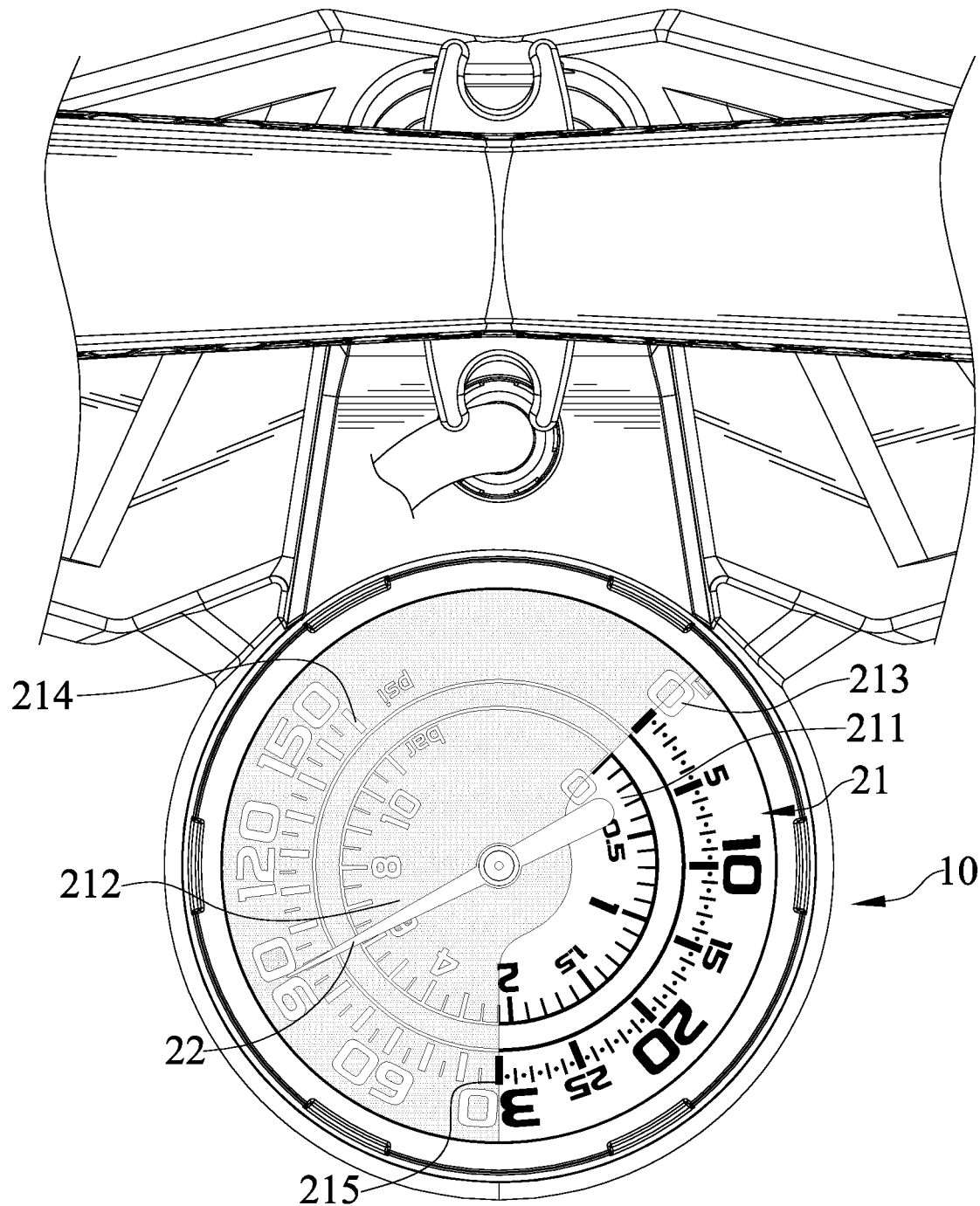
FIG. 10 is a top view showing the indicator of the pressure gauge of the present invention in the second region.
Figure 11:
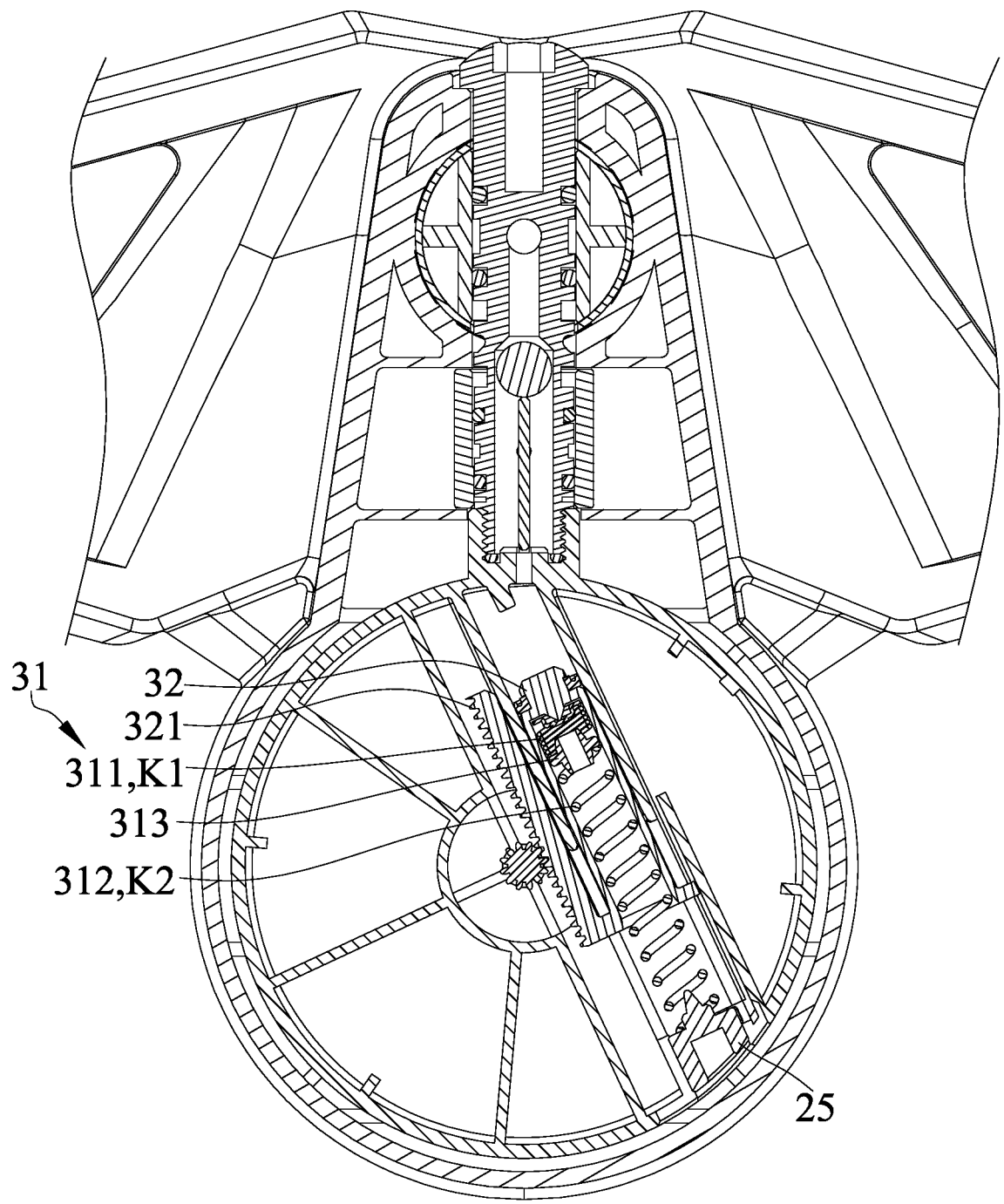
FIG. 11 is a cross-sectional view different from FIG. 4 in that the indicator is in the position shown in FIG. 10.
Figure 12:
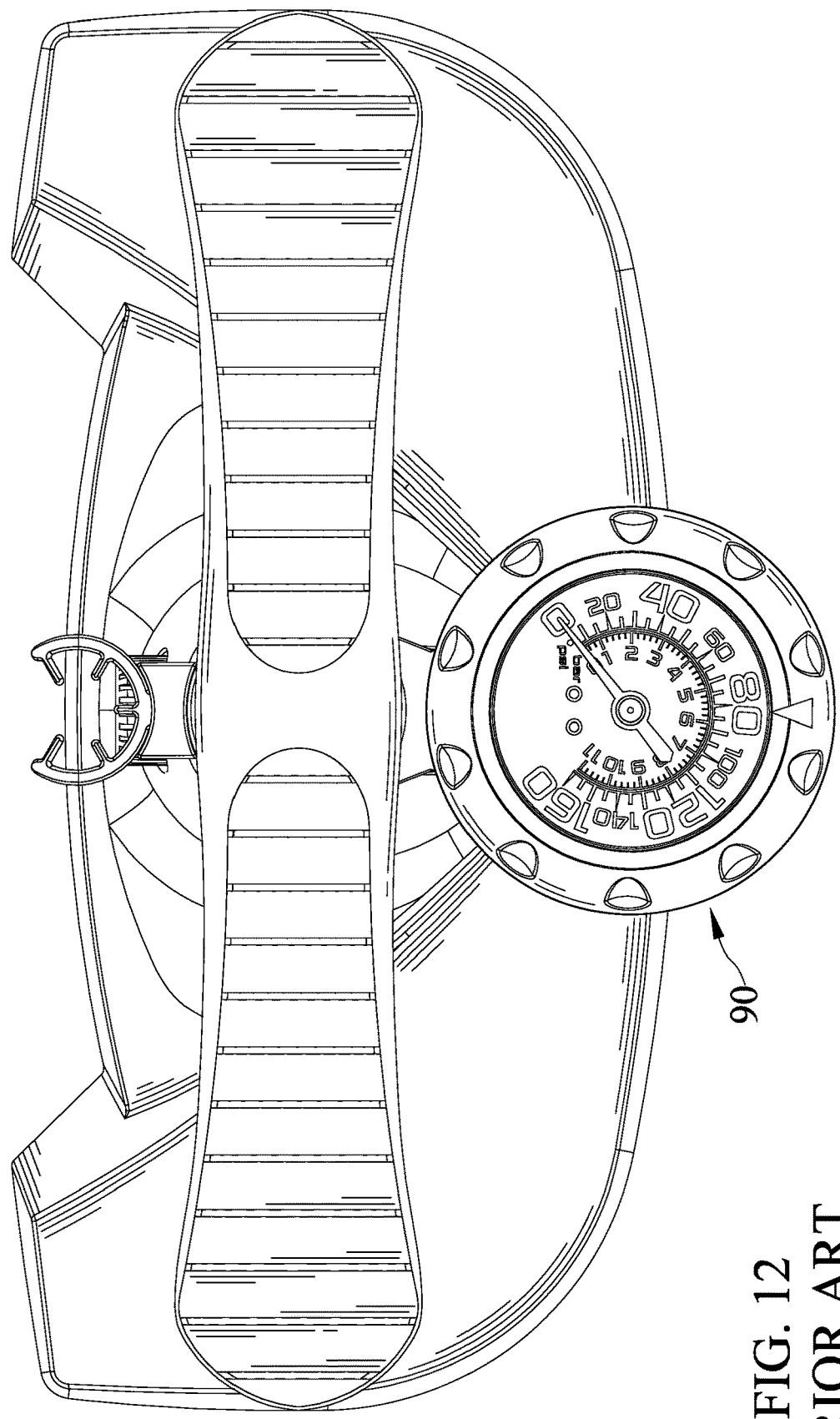
FIG. 12 is a top view showing a pump with a conventional pressure gauge.

FIGS. 1 through 12 show a pressure gauge 10 in accordance with the present invention. The pressure gauge 10 includes a base 20, a dial 21, an indicator 22, and a shaft 23.

The base 20 defines a channel 24. The channel 24 has an opening fluidly connected to a pump 80. The opening allows air to flow from the pump 80 to channel 24. A plug 25 is releasably secured to the channel 24.

The dial 21 is located on the base 20. The dial 21 has graduations ranging from a first graduation 213 to a last graduation 214 and includes a middle graduation 215 located between the first and last graduations 213 and 214. The indicator 22 is adapted to point graduations on the dial 21.

The graduations of the dial 21 are divided by the middle graduation 215 into a first region 211 for low pressure measurements and a second region 212 for high pressure measurements. The first region 211 includes the graduations between the first and middle graduations 213 and 215. The graduations in the first region 211 are equally spaced at a first distance. The second region 212 includes the graduations between the middle and last graduations 215 and 214. The graduations in the second region 212 are equally spaced at a second distance different from the first distance. The first graduation 213 is 0 psi. The last graduation 214 is 160 psi. Since a pressure for a low pressure tire does not exceed 60 psi, the middle graduation 215 is 60 psi or less such that the indicator 22 registers with the middle graduation 215 for a pressure not exceeding 60 psi. In the embodiment, the middle graduation 215 is 30 psi. Moreover, the middle graduation 215 and the last graduation 214 are angularly spaced at a first angle A1 such that the indicator 22 rotates through the first angle A1 from the middle graduation 215 to the last graduation 214 and vice versa; the first graduation 213 and the middle graduation 215 are angularly spaced at a second angle A2 such that the indicator 22 rotates through the second angle A2 from the first graduation 213 to the middle graduation 215 and vice versa; and the second angle A2 is 0.3-0.7 times of the first angle A1. Further, a differential between adjacent graduations in the first region 211 is less than 4 psi. Additionally, the graduations in the first region 211 and the graduations in the second region 212 are displayed in different colors.

The shaft 23 is rotatably connected to the base 20. The indicator 22 is connected to the shaft 23 and rotates simultaneously with rotation of the shaft 23.

An actuating device 30 includes a pressure responding device 31 and a plunger 32. Air flowing from the pump 80 to the channel 24 is able to urge the actuating device 30. The pressure responding device 31 and the plunger 32 are held in the channel 24. The channel 24 has an inlet and an outlet and extends from the inlet to the outlet in an oblique direction toward the first region 211 of the dial 21. The plunger 32 is connected to the shaft 23. The shaft 23 is rotated in response to movement of the plunger 32. The shaft 23 has a plurality of first gear 231 spaced circumferentially, and the plunger 32 has a plurality of second gear 321 spaced axially and engaging with the plurality of first gear 231. The plunger 32 and the indicator 22 are located on opposite sides of the dial 21. The plunger 32 is abutted by the pressure responding device 31. The plunger 32 has a positioning projection 322 and a stabilizing structure 323 supported by the positioning projection 322. The stabilizing structure 323 has a positioning recess 324 for engaging with positioning projection 322. The pressure responding device 31 includes a first resilient member 311 having a first modulus of elasticity K1 and a second resilient member 312 having a second modulus of elasticity K2 different from the first modulus of elasticity arranged in series. The first and second resilient members 311 and 312 are retained between the plunger 32 and the plug 25. The first modulus of elasticity K1 is smaller than the second modulus of elasticity K2. The first and second resilient members 311 and 312 change their lengths and the plunger 32 is urged by the first and first and second resilient members 311 and 312 when the indicator 22 registers with different graduations. The first and second resilient members 311 and 312 are compressed more as the indicator 22 moves from the first graduation 213 to the last graduation 214. The length of the first resilient member 311 is the same when the indicator 22 registers with the middle graduation 215 as that when the indicator 22 registers with the graduations in the second region 212. The first and second resilient members 311 and 312 are torsion springs. Further, a separating member 313 is interposed between the first and second resilient members 311 and 312 such that the separating member 313 has one side abutted by the first resilient member 311 and another side abutted by the second resilient member 312 respectively. The first resilient member 311 is held between the separating member 313 and the stabilizing structure 323. The first resilient member 311 has one end abutted by the separating member 313 and another end abutted by the stabilizing structure 323 respectively. The stabilizing structure 323 has a surface 325 for stably supporting another end of the first resilient member 311. The surface 325 is flat and has a cross section not less than that of another end of the first resilient member 311. In addition, an air seal 326 is provided between the plunger 32 and the channel 24. The air seal 326 has an inner periphery engaging with the plunger 32 and an outer periphery engaging with the channel 24 respectively. The air seal 326 is resilient.

In view of the forgoing, the pressure gauge 10 allows a user measure high and low pressures while eliminates errors in both low and high pressures measurements. The graduations in the first region 211 of the dial 21 are smaller than that the graduations in the second region 212 of the dial, thereby enabling accurate low pressure measurements. Furthermore, the second region 212 of the dial 21 includes graduations greater than 110 psi, because a high pressure tire is generally pumped to 110 psi at least.

The foregoing is merely illustrative of the principles of this invention, and various modifications can be made by those skilled in the art without departing from the scope and spirit of the invention.

What is claimed is:

1. A pressure gauge comprising:
   a base, a dial, an indicator, and a shaft, wherein the base defines a channel, wherein the dial is located on the base, wherein the dial has graduations ranging from a first graduation to a last graduation and includes a middle graduation located between the first and last graduations, wherein the graduations of the dial are divided by the middle graduation into a first region for low pressure measurements and a second region for high pressure measurements, wherein the first region includes the graduations between the first and middle graduations, wherein the graduations in the first region are equally spaced at a first distance, wherein the second region includes the graduations between the middle and last graduations, wherein the graduations in the second region are equally spaced at a second distance different from the first distance, wherein the indicator is adapted to point graduations on the dial, wherein the shaft is rotatably connected to the base, and wherein the indicator is connected to the shaft and rotates simultaneously with rotation of the shaft; and
   an actuating device including a pressure responding device and a plunger, wherein the pressure responding device and the plunger are held in the channel, wherein the plunger is abutted by the pressure responding device, wherein the pressure responding device includes a first resilient member having a first modulus of elasticity and a second resilient member having a second modulus of elasticity different from the first modulus of elasticity arranged in series, wherein the first and second resilient members change length and the plunger is urged by the first and first and second resilient members when the indicator registers with different graduations, wherein the plunger is connected to the shaft, and wherein the shaft is rotated in response to movement of the plunger.

2. The pressure gauge as claimed in claim 1, wherein the graduations in the first region and the graduations in the second region are displayed in different colors.

3. The pressure gauge as claimed in claim 2, wherein the middle graduation is 60 psi or less such that the indicator registers with the middle graduation for a pressure not exceeding 60 psi.

4. The pressure gauge as claimed in claim 1, wherein the middle graduation is 60 psi or less such that the indicator registers with the middle graduation for a pressure not exceeding 60 psi.

5. The pressure gauge as claimed in claim 4, wherein a differential between adjacent graduations in the first region is less than 4 psi.

6. The pressure gauge as claimed in claim 1, wherein the middle graduation and the last graduation are angularly spaced at a first angle such that the indicator rotates through the first angle from the middle graduation to the last graduation and vice versa, wherein the first graduation and the middle graduation are angularly spaced at a second angle such that the indicator rotates through the second angle from the first graduation to the middle graduation and vice versa, and wherein the second angle is 0.3-0.7 times of the first angle.

7. The pressure gauge as claimed in claim 6, wherein the middle graduation is 60 psi or less such that the indicator registers with the middle graduation for a pressure not exceeding 60 psi.

8. The pressure gauge as claimed in claim 7, wherein the graduations in the first region and the graduations in the second region are displayed in different colors.

9. The pressure gauge as claimed in claim 7 further comprising a separating member interposed between the first and second resilient members such that the separating member has one side abutted by the first resilient member and another side abutted by the second resilient member respectively.

10. The pressure gauge as claimed in claim 7, wherein the shaft has a plurality of first gear spaced circumferentially, wherein the plunger has a plurality of second gear spaced axially and engaging with the plurality of first gear.

11. The pressure gauge as claimed in claim 6, wherein the channel has an inlet and an outlet and extends from the inlet to the outlet in an oblique direction toward the first region of the dial.

12. The pressure gauge as claimed in claim 11, wherein the graduations in the first region and the graduations in the second region are displayed in different colors.

13. The pressure gauge as claimed in claim 11, wherein the shaft has a plurality of first gear spaced circumferentially, wherein the plunger has a plurality of second gear spaced axially and engaging with the plurality of first gear.

14. The pressure gauge as claimed in claim 1 further comprising a separating member interposed between the first and second resilient members such that the separating member has one side abutted by the first resilient member and another side abutted by the second resilient member respectively.

15. The pressure gauge as claimed in claim 1, wherein the shaft has a plurality of first gear spaced circumferentially, wherein the plunger has a plurality of second gear spaced axially and engaging with the plurality of first gear.

16. The pressure gauge as claimed in claim 1 further comprising a plug releasably secured to the channel, and wherein the first and second resilient members are retained between the plunger and the plug.

17. The pressure gauge as claimed in claim 1 further comprising an air seal provided between the plunger and the channel, and wherein the air seal has an inner periphery engaging with the plunger and an outer periphery engaging with the channel respectively.

18. The pressure gauge as claimed in claim 1, wherein the channel has an inlet and an outlet and extends from the inlet to the outlet in an oblique direction toward the first region of the dial.

* * * * *